United States Patent [19]

Chung et al.

[11] Patent Number: 5,254,265
[45] Date of Patent: Oct. 19, 1993

[54] GARBAGE DISPOSAL SYSTEM

[76] Inventors: Yung Rung Chung, 3F-3, No. 8, Alley 1, Lane 166, Peita Road, Hsinchu; S. C. Lee, 8F-2, No. 2, Lanz 6, Lanchou St., Taipei, both of Taiwan

[21] Appl. No.: 922,371

[22] Filed: Jul. 31, 1992

[51] Int. Cl.$^5$ .................. B30B 11/00; F23G 5/00
[52] U.S. Cl. ..................... 210/774; 210/768; 210/807; 100/38; 110/203; 241/23
[58] Field of Search ............ 55/DIG. 30; 100/37, 100/38, 39, 935, 218; 110/203, 221; 210/768, 774, 807; 241/22, 23

[56] References Cited

U.S. PATENT DOCUMENTS

| | | | |
|---|---|---|---|
| 3,696,583 | 10/1972 | Tezuka | 100/218 |
| 3,910,775 | 10/1975 | Jackman | 241/24 |
| 4,036,593 | 7/1977 | Satoh | 55/223 |
| 5,001,975 | 3/1991 | Finden | 100/38 |

*Primary Examiner*—Robert A. Dawson
*Assistant Examiner*—David Reifsnyder

[57] ABSTRACT

A garbage disposal system for household garbage which includes a crushing and shearing unit for the process to separate the liquid from the solid and to shear the solid into refuse strips, a screw friction machine to supply the heat source for a scrap metal recovery unit to collect scrap metal from refuse strips, a drying and a high-temperature heating process to heat refuse strips into dry state, a compressing process to compress refuse strips into refuse blocks, and a cement blocking process to make refuse blocks into caissons for sea water concrete or tidal land construction. Waste liquid filter and waste gas filter are used to filtrate impurities from waste liquid or gas.

1 Claim, 1 Drawing Sheet

GARBAGE DISPOSAL SYSTEM

BACKGROUND OF THE INVENTION

The present invention relates to a garbage disposal system for household garbage and relates more particularly to such a garbage disposal system which eliminates the problem of secondary pollution and making the garbage into useful material.

Several methods are known and widely used to treat the garbage in some countries. These methods including dumping the garbage at appointed spots, sealing the dumps with clay to ensure fermentation, burning the garbage through a garbage furnance. etc. However, these conventional methods are still not satisfactory in function because of secondary pollution during or after the treatment.

SUMMARY OF THE INVENTION

The present invention eliminates the aforesaid problems. It is therefore the main object of the present invention to provide a garbage disposal system for treating a city garbage which does not produce any secondary pollution problem. Besides, there is an another object of this invention to provide a garbage disposal system which makes the garbage into useful material for tidal land construction. The garbage disposal system according to the present invention is to separate the liquid from the solid by the process of crushing and shearing, to collect the scrap metal by a magnetic device, and then to heat up and rapidly screw the solid refuse to be dried and compressed into the shape of blocks for making caissons.

DETAILED DESCRIPTION OF THE PREFERRED EMBODIMENT

Figure 1:
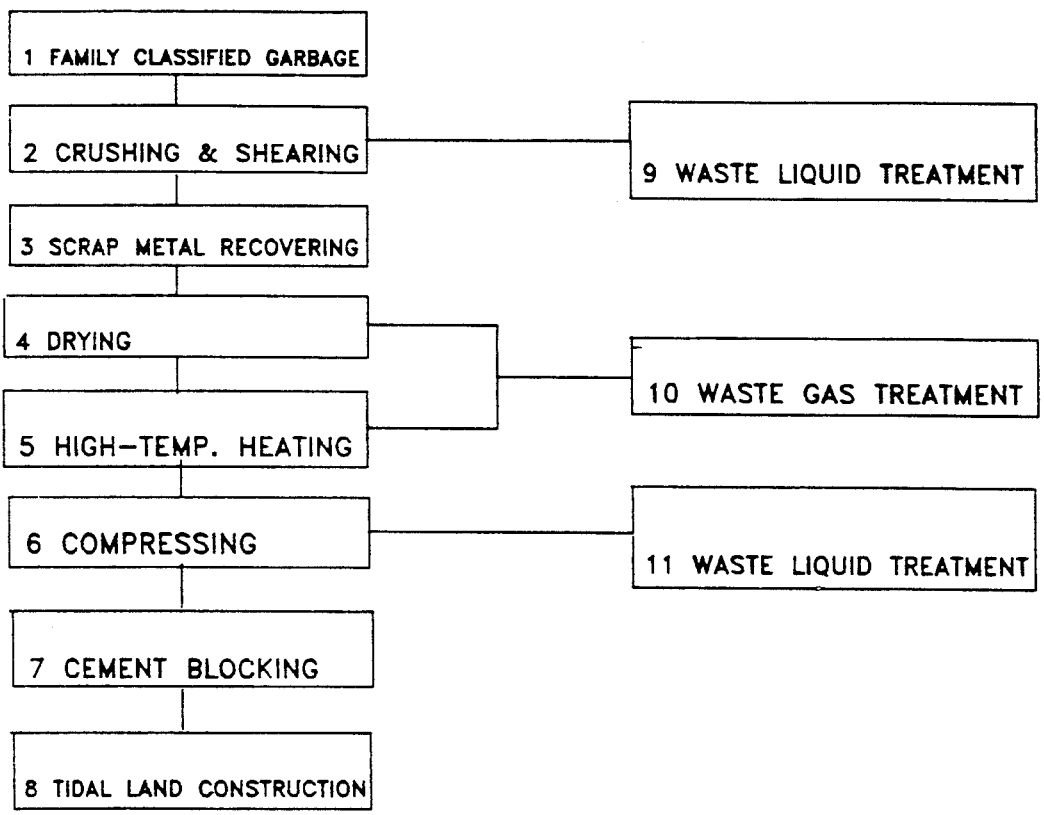
FIG. 1 is a flow chart of the garbage disposal system.

Referring to FIG. 1, the garbage 1 which is collected by garbage wagons is delivered to a crushing and shearing unit 2 and treated through the process of crushing to reduce its size and separate the solid from the liquid and the process of shearing to cut the solid thus obtained into refuse strips in approximately 1 cm width. The liquid which was squeezed from the garbage 1 is delivered to a waste liquid treatment unit 9. The solid thus obtained is treated through a scap metal recover unit 3. At the scrap metal recovery unit 3, scrap metal is separated from the solid refuse for further re-use. The solid refuse which was left after the process through the scrap metal recovery unit 3 is then treated through a drying process 4 at 80°-90° C. for 4 to 5 hours, in a heating tunnel by a radiator using the heat energy source provided from process 5, and then treated through a high-temperature heating process 5 for sterilization at 200°-300° C. in a screw-friction machine which is rotated at 2400-3600 rotation per minute to produce a large quantity of heat energy due to the effects of friction and compression for self-sufficiency. During the high-temperature heating process 5, little air is provided, and therefore no combustion will being happened. This arrangement reduces the amount of waste gas and stabilize the solid refuse. During the drying process 4, and the high-temperature heating process 5, waste gas is collected and treated through a waste gas treatment process 10. During the waste gas filtration process 10, pollutants are removed from waste gas through a filter layer of active carbon, ozone, water, and fine sand. Therefore, little air pollution is reduced to minimum. The stabilized solid refuse after the high-temperature heating process is treated through a compression process 6 by a hydraulic press machine into a refuse block of size 1 meter × 1 meter × 1.5 meter. The refuse block is put into a cement box for sealing treatment. Cement block 7, a caisson, is ready for sea water concrete or tidal land construction 8. Any waste liquid which is produced from the compression process 6 is delivered to another waste liquid treatment unit 11. The waste liquid treatment unit 9 or 11 uses a filter layer of fine sand, charcoal, wooden chip, ozone and gravel to filtrate solid particles and impurities from waste liquid.

As indicated, the present invention is to provide a garbage disposal system having numerous features as follows:

1). No secondary pollution is produced (any waste gas or liquid is treated before discharging);

2) Waste refuse is utilized for making tidal land;

3) The total size of the garbage is greatly reduced to approximately one tenth of its original size; and 4) Less waste gas is released when the garbage is treated through the garbage disposal system.

What is claimed is:

1. A garbage disposal system for household garbage comprising the process of:
   a. crushing and shearing process to crush the collected garbage and separate the liquid from the solid, and then to shear the solid into refuse strips in approximately 1 cm width;
   b. scrap metal recovery process to separate scrap metal from the refuse strips for re-use;
   c. drying process to heat the solid refuse which was left after said process "b" at 80°-90° C. in a heating tunnel for 4 to 5 hours;
   d. high-temperature heating process for sterilization to heat the dried solid refuse which was left after the process "c" at 200°-300° C. in a screw-friction machine which is rotated at 2400-3600 rotation per minute characteristically to produce a large quantity of heat energy due to the effects of friction and compression for self-sufficiency and also to supply heat source for said drying process;
   e. compression process to compress the solid refuse which was left after said process "d" into a refuse block by a hydraulic press machine;
   f. cement blocking process to put the refuse block thus obtained from said process "e" in a cement box for sealing and making into a caisson for sea water concrete or tidal land construction;
   g. waste liquid treatment process to filtrate pollutants from waste liquid produced from said process "a" and "e" by means of a liquid filter layer of fine sand, charcoal, wooden chip, gravel, and ozone;
   h. waste gas treatment process to filtrate waste gas produced from said process "c" and "d" by means of a gas filter layer of active carbon, ozone and fine sand.

* * * * *